United States Patent [19]

Lutz

[11] Patent Number: 5,318,486
[45] Date of Patent: Jun. 7, 1994

[54] DRIVING HUB FOR A VEHICLE, PARTICULARLY A BICYCLE, WITH AN INFINITELY ADJUSTABLE TRANSMISSION RATIO

[75] Inventor: Manfred Lutz, Schweinfurt, Fed. Rep. of Germany

[73] Assignee: Fichtel & Sachs AG, Schweinfurt, Fed. Rep. of Germany

[21] Appl. No.: 930,771

[22] Filed: Aug. 14, 1992

[30] Foreign Application Priority Data

Aug. 16, 1991 [DE] Fed. Rep. of Germany ....... 4126993

[51] Int. Cl.$^5$ .................... B62M 11/14; F16H 15/00
[52] U.S. Cl. .................................. 475/214; 475/207; 475/215; 475/216; 475/296; 476/38
[58] Field of Search ............... 475/207, 208, 209, 214, 475/215, 216, 296, 297; 476/38; 192/6 A

[56] References Cited

U.S. PATENT DOCUMENTS

| | | | |
|---|---|---|---|
| 2,469,653 | 1/1946 | Kopp | 74/200 |
| 3,248,960 | 5/1966 | Schottler | 476/38 X |
| 4,735,430 | 4/1988 | Tomkinson et al. | 280/236 |
| 4,756,211 | 7/1988 | Fellows | 475/214 X |
| 4,856,374 | 8/1989 | Kreuzer | 475/216 X |
| 4,900,046 | 2/1990 | Aranceta-Angoitia | 475/214 X |
| 4,909,101 | 3/1990 | Terry, Sr. | 475/297 X |
| 5,020,384 | 6/1991 | Kraus | 475/214 X |

FOREIGN PATENT DOCUMENTS

| | | |
|---|---|---|
| 0432742 | 6/1991 | European Pat. Off. |
| 2136243 | 2/1972 | Fed. Rep. of Germany |
| 2310880 | 9/1973 | Fed. Rep. of Germany |
| 3940919 | 6/1991 | Fed. Rep. of Germany |
| 0037462 | 1/1989 | Japan ........................ 475/214 |
| 2080452 | 2/1982 | United Kingdom |

OTHER PUBLICATIONS

F. R. Whitt et al., "Bicycling Science", MIT Press, 1988, p. 282.

Primary Examiner—Leslie A. Braun
Assistant Examiner—Daniel Wittels
Attorney, Agent, or Firm—Brumbaugh, Graves, Donohue & Raymond

[57] ABSTRACT

The drive hub for a vehicle, particularly for a bicycle, includes a hub axle 1, a hub shell 9 rotatable relative thereto, and a driver or actuator 13 mounted on the hub axle 1. The driver 13 drives the hub shell 9 over a ball friction gear 17, the ball carrier plates 25 and 27 of which form with the hub axle 1 a rigid gear housing the balls 35 of which, with a guide ring 33, a drive ring 51 and a driven ring 55, enter into a frictional connection which, by the swivelling of the axle pins 37 between drive ring 51 and driven ring 55, permits different rotational speeds. The pressure forces are produced by a thread 47 between driver 13 and drive sleeve 49 proportionally to the driving torque, the pressure spring 57 ensuring a dead-travel-free response of the ball friction gear 17. The infinitely variably adjustable transmission ratio of the ball friction gear 17 is controlled through a control device 79 consisting of rotational elements, through a solid cone 29 which sets in rotation a crank wheel 91, as a result of which the spiral-shaped guide grooves 95 move the ball projections 39 of the ball axles 37 radially outwards or inwards, depending upon the direction of rotation. The ball axles thus swivelled provide for an infinitely variably adjustable transmission ratio between drive ring and driven ring.

22 Claims, 3 Drawing Sheets

DRIVING HUB FOR A VEHICLE, PARTICULARLY A BICYCLE, WITH AN INFINITELY ADJUSTABLE TRANSMISSION RATIO

BACKGROUND OF THE INVENTION

The invention relates to a drive hub for a vehicle, particularly a bicycle, with a friction gear the transmission ratio of which can be adjusted in stepless manner.

From the manual "Bicycling Science" by Frank Rowland Witt, David Gordon Wilson, The MIT-Press, Cambridge and London, 1988, 2nd edition, page 282, several construction principles of friction gears are known, reference being made to the problems in connection with such friction gears in connection with bicycle hubs. These problems consist in that in bicycle hubs relatively high torques for low speeds are to be transmitted, in connection with which the transmission ratio is to be adjustable in such a manner that, according to requirements, the hub shell rotates faster or slower than the driver. One of the main constructional forms represented is a friction gear in the form of a ball friction gear, wherein friction balls, stationarily mounted with angle-adjustable ball axes on the outer periphery designed in the manner of a cone, roll both on a driving wheel and on a driven wheel for the transmission of a corresponding torque from the driving plate to the driven plate.

DE-21 36 243 A1 shows a static gear with input shaft and an output shaft coaxial therewith. The friction balls used here are freely rotatably mounted and roll on a total of four locating faces adjustable relative to one another, the axis of rotation of the balls adjusting itself accordingly. The drive of the friction balls is effected over a slanting outer peripheral surface of a drive plate connected with the driving axle. Provided is an expanding coupling for increasing the pressing force as the torque increases. The construction of this gear is costly. A direct precise setting of a desired transmission ratio is not possible. The stationary housing, in which, inter alia, a driving worm of the control device is provided, cannot be replaced by a rotating hub shell.

U.S. Pat. No. 4,735,430 shows a drive hub for bicycles with a friction gear which is based upon the principle of torque transmission by means of friction wheels which roll on toroid surfaces of oppositely placed toroid plates. The hub axle here, differently from the standard drive hubs, is rotatably mounted in the bicycle frame, so that special mounting means are required. The two toroid plates rotate in opposite directions. In order, however, to drive the hub shell in the direction of rotation of the driver, a planetary gear reversing the direction of rotation with stationary planetary gear carrier is therefore necessary in this construction. The planet wheel engage into a ring geared wheel connected with the friction gear, as well as into a sun wheel gearing connected with the hub shell, so that the friction gear therefore runs more slowly than the hub shell. For a predetermined drive performance the friction gear must therefore be designed for the transmission of high torques. Particularly, high pressing forces are necessary in the friction gear so as to avoid undesirable slip. The friction gear is always moving for all possible transmission rations, which brings about friction losses.

An improvement of this hub is shown in EP 0 432 742 A1. The hub axle, as is usual in bicycles, can be incorporated rigidly into the bicycle frame. This bicycle hub also operates according to the principle of toroid plates. For the adaptation of the speed range of this hub to the transmission ratios usual in bicycles a planetary gear is provided, the planet wheel carrier being connected with the hub shell, and the planet wheels engage, on the one hand, into a stationary ring gear, and on the other hand, into a sun wheel connected with the friction gear. The ring gear is connected with the hub axle by means of an inner barrel surrounding the friction gear and extending over a great part of the axial length of the hub shell, which increases the constructional expenditure as well as the required space for incorporation. The planetary gear moves independently of the respective set transmission ratio. Finally, the constructional expenditure for bicycle hubs which operate according to the toroid plate principle is particularly high, especially because the making of the gear demands high manufacturing precision. Also, the transmission range in this construction is confined within relatively narrow limits.

SUMMARY OF THE INVENTION

It is the object of the invention to provide a drive hub for a vehicle, particularly a bicycle, the transmission ratio of which can be adjusted in stepless manner. The drive hub should be of simple and economic construction. Furthermore, the efficiency should be high. A great transmission range should be provided.

The invention is based on a drive hub for a vehicle, particularly a bicycle, comprising
- a hub axle, which determines an axle of the hub;
- a hub shell surrounding the hub axle with identical axis and rotatable relative thereto;
- a driver rotatably mounted relative to the hub shell and the hub axle;
- a friction gear mounted inside the hub shell in the path of force between driver and hub shell;
- at least one coupling device closing the power path between the driver and the hub shell when the hub is driven by the driver, and opening the power path when the driver is not driving;
- a planetary gear in the power path between driver and hub shell;
- a control device externally actuatable for the infinitely variable adjustment of the transmission ratio of the friction gear.

The improvement according to the invention consists in that the friction gear is designed as a ball friction gear and includes
- two rings, one driving ring and one driven ring, facing each other axially;
- several friction balls distributed in the circumferential direction of the rings, joining the rings together in frictional engagement, and which are rotatably mounted by means of ball axles, and
- a friction ball carrier mounted to the hub axle for joint rotation, on which carrier the friction balls with their ball axles are respectively swivellably mounted in a plane which contains the axle of the hub, wherein a planet wheel carrier of the planetary gear is coupled with the driver, said planet gear carrier being provided with planet wheels engaging on the one hand with a sun wheel coupled with the driven ring, and on the other hand with a ring gear coupled with the hub shell, and wherein the control device is adapted for the joint swivelling of the ball axles.

The planetary gear provides for a faster rotation of the friction gear than that of the hub shell. Therefore, correspondingly smaller torques have to be transmitted from the friction gear, which reduces the necessary pressing forces. The axial forces and frictional forces occurring are correspondingly smaller with reduction of the friction losses. The drive ring or driven ring can, in the two extreme positions of the ball axle contact the friction ball along a contact ring with rather small diameter encircling the ball axle, so that a very high or very low transmission ratio is produced. The transmission range may be comprised between 1 : 7 and 1 : 9. This is then reduced for use in the bicycle by the planetary gear situated downstream, e.g. 1 : 2.5. The frictional and axial forces occurring are therefore reduced to about ⅓ by the manner of construction of the invention. By the corresponding adaptation of the planetary gear it is also possible to achieve a higher transmission ratio of the hub. An essential advantage of the construction of the invention lies in that the planetary wheel carrier is coupled with the driver and neither the sun wheel nor the ring gear is stationary. When the driver and the hub shell rotate at the same speed, both the sun wheel and the ring gear as well as the planet wheel carrier rotate accordingly at the same speed, so that the planetary gear rotates as a whole, and the planet wheels remain motionless inside the rotating planetary gear. At a mostly used mean transmission ratio of 1 : 1 set for the wheel hub there occur therefore no frictional losses at all in the planetary gear. At a higher or lower transmission ratio the planetary gear is called on only correspondingly to the difference of the rotational speeds between driver and hub shell. A great deal of the drive performance is transmitted over a short distance from the driver via the planetary gear to the hub shell, whereas only a small part of the power passes through the ball friction gear depending upon the transmission ratio set. The entire efficiency of the drive hub is therefore high. The pressure forces required for the slip-free operation of the ball friction gear can be kept relatively low.

For the rotatable mounting of the planet wheels the driver may be provided with corresponding bolts.

Preferably, the coupling device is designed as a pawl free-wheel coupling which is mounted between the ring gear and the hub shell. When the driver is static, only the hub shell consequently rotates. Only a small space for mounting will be required for the pawl free-wheel coupling when, as proposed, the pawl toothing of the pawl free-wheel coupling is provided on the inner periphery of the hub shell.

In a specially preferred embodiment of the invention it is provided, for the axial tensioning of the ball friction gear with increase of the pressure force between the friction balls and the driving and driven rings with increasing driving torque, to mount a threaded connection in the power path between driver and ball friction gear. This thread provides for a pressure force proportionally increasing with the drive torque, so that a light low-loss drive hub run is ensured with small pressure forces, as well as slip-free operation with higher pressure forces. It is of particular advantage that the geared connection requires practically no additional mounting space.

In a mechanically robust and thus constructively simply designed embodiment of the invention it is provided that the drive ring is connected with the driver by means of a drive sleeve for torque transmission, in which arrangement the drive sleeve is joined solid in rotation with one of the two parts, driver and drive ring, and is coupled with the other of the two parts by means of a right-hand thread. The right-hand thread provides, in the usual drive direction in a bicycle hub, for the necessary tensioning.

Preferably, it is provided that the screw thread should be a flat thread with substantially rectangular tooth profile. Such a screw thread is simple to produce and exhibits low loading of the tooth profiles, so that the wear is negligible also with high torques.

A compact construction is achieved in that the drive sleeve forms with the hub axle a bearing which it surrounds over its entire length.

Contributing to this is the proposed measure that the driven ring and the sun wheel are joined together as one piece and form a tubular body which is rotatably mounted on the drive sleeve.

For the mounting of the friction balls it is proposed that the friction ball carrier should have a first ball carrier plate which is connected solid in rotation with the hub axle, and a plurality of radial grooves to receive the ends of the ball axles protruding over the friction balls. In this connection it is particularly preferably provided that the friction ball carrier should have a second ball carrier plate which is connected solid in rotation with the first ball carrier plate, and which is provided with a plurality of grooves which lie opposite the grooves of the first ball carrier plate. In this manner a twist-rigid unit is obtained from the two friction ball carriers. The oppositely situated grooves ensure a precise guiding of the ends of the ball axles, as a result of which the joint swivellability of the ball axles is ensured.

The balls can be rotatably mounted on the ball axles. With a view to simple robust construction the ball axles, however, are rigidly connected with the friction balls. Especially for this case it is proposed that the ends of the ball axles should be provided with ball bearings which engage into the respective radial groove with play for moving the respective end in radial direction. The ball bearings radially movable in the grooves thus provide for the rotatable mounting of the friction balls in all possible angular positions of the ball axles with a high degree of precision. Differences of speed at the friction areas with successive friction balls can be avoided so that the wear of the ball friction gear can be kept low.

For the joint swivelling of the ball axles it is proposed that at least one of the two ends of the ball axles is provided with a connection part onto which the control device engages for the swivelling of the ball axles. It is preferably provided in this connection that the control device includes a crank slider wheel with guide grooves into which the connection parts designed as ball projections for the ball axles engage. In order, in this arrangement, to absorb directly the relatively high adjustment forces, it is proposed that the guide grooves should be of spiral design, guiding the ball projections with small play, and that the crank slider wheel should be designed, on its side facing the guide grooves, with a ring gear toothing, into which a control pinion engages. By the corresponding selection of the number of teeth of the ring gear toothing and the control pinion the adjustment force required for the adjustment of the transmission ratio can be correspondingly reduced. Thus, the control device can be moved by the user for example by means of a main and tail cable arrangement in both directions almost without play.

So as to be able to produce the necessary pressure force between the friction balls and the driving and driven rings, the corresponding reaction forces directed radially outwards must be absorbed by the drive hub. The friction balls could for the purpose roll on their side facing away from the axis of the hub on corresponding rollers or the like which have a stationary pivot bearing. Specially preferably, however, it is provided that all friction balls roll on the inner circumference of a guide ring freely rotatably mounted in the hub shell. The axial forces of all ball's compensate one another in this manner, so that there is no need for any special costly pivot bearing of the guide ring inside the hub shell.

So that also on starting, i.e. on a low or almost disappearing driving torque, to obtain an adequate mutual pressure force of friction balls and driver and driven rings, there is proposed a tensioning spring member for the axial tensioning of the driving ring and the driven ring towards each other. The tensioning spring element thus provides for a permanent friction locking connection of the cooperating parts of the bal friction bearing. This forward pressing provides for a permanent readiness for service of the hub before the build up of the axial tension of the ball friction bearing with the driving torque, particularly by virtue of the action of the aforementioned threaded connection. In each case there is obtained for each friction ball a stable triangle of forces which is formed by the points of application of the two rings (driving and driven) as well as of the guide ring.

It is preferably provided that the tensioning spring member be designed as a pressure spring which bears on the one hand on a drive sleeve joining the driver ring with the driver, and on the other hand on an annular body supporting the driven ring and surrounding the driving sleeve. For a further improvement of the arrangement it is proposed that the pressure spring should bear on the other hand on an axial bearing mounted between the annular body and the driver. The pressure spring is thus mounted between two application parts which twist only insignificantly relative to each other in operation, namely on the part of the axial bearing on the driving ring side, as well as on the driving sleeve. The two parts, because of the threaded connection between driver and driving sleeve, twist only slightly with an altering driving torque.

Furthermore, it is provided that the inner axial forces issuing from the driver should be absorbed by the driving sleeve, the driving ring, the friction balls, a guide ring surrounding the friction balls, the driven ring and an axial bearing mounted between driven ring and driver. The axial forces occurring during operation and also relatively high for high torques are compensated in the manner indicated. As they run neither over the hub shell nor over the hub axle, the drive hub can be lightly constructed correspondingly.

The various features of novelty which characterize the invention are pointed out with particularly in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWINGS

Figure 1:
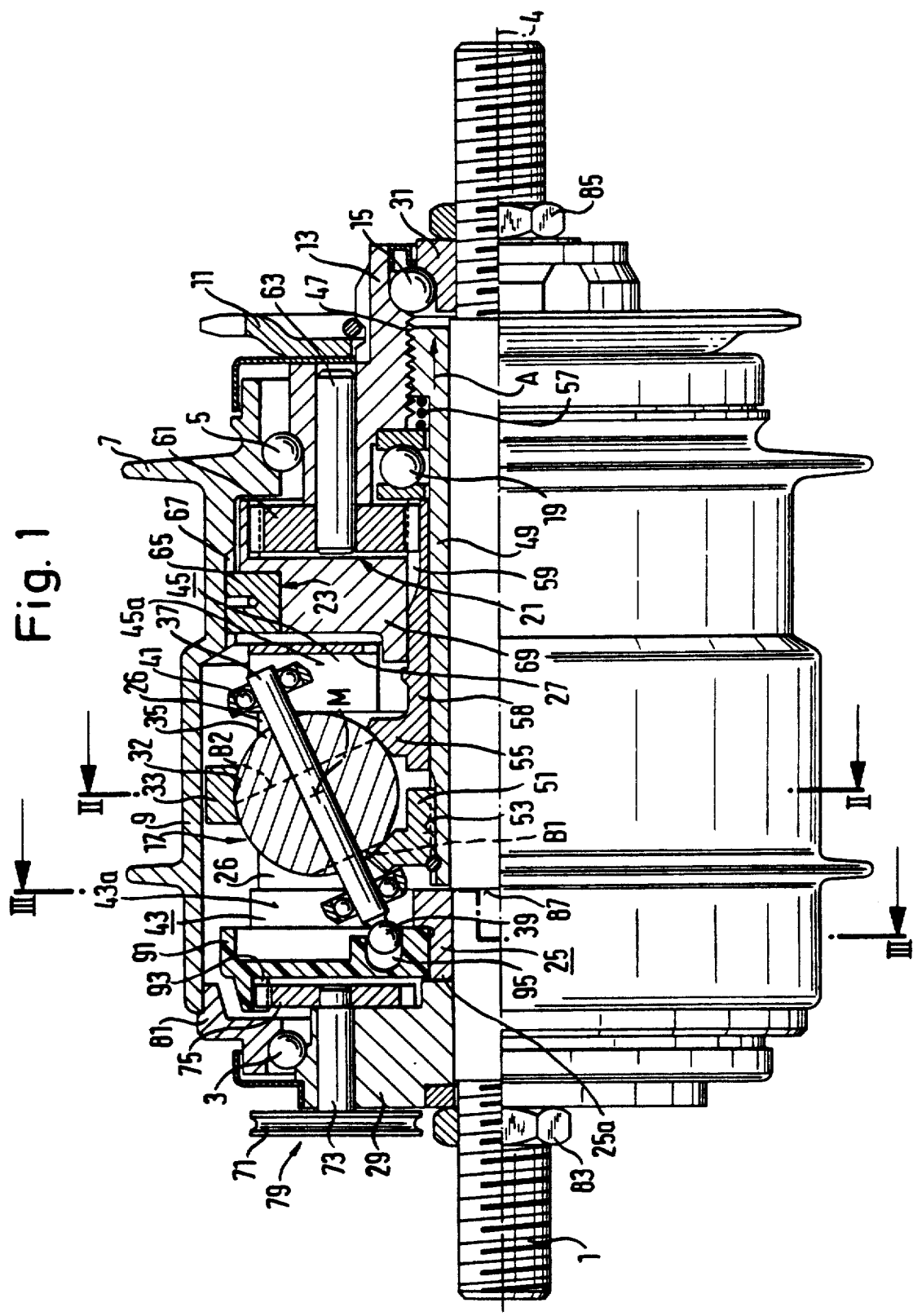
FIG. 1 is an axial longitudinal section through a drive hub of a bicycle.
Figure 2:
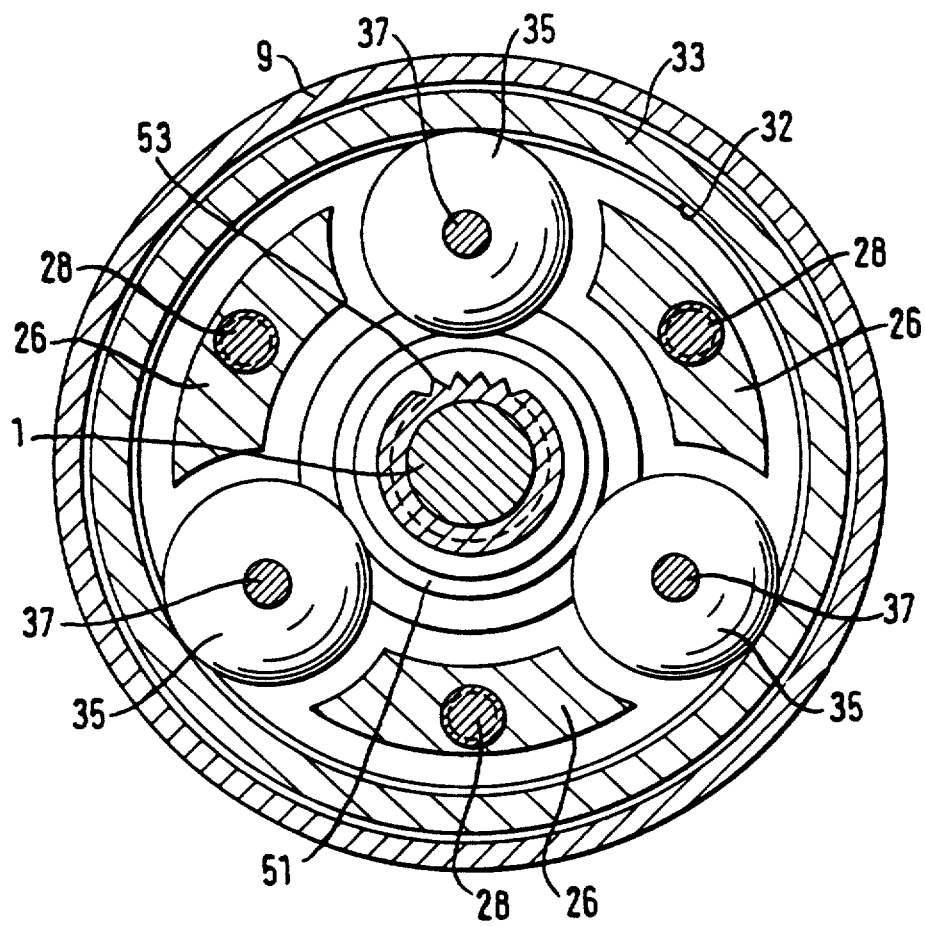
FIG. 2 is a section of the drive hub along line II-II in FIG. 1.
Figure 3:
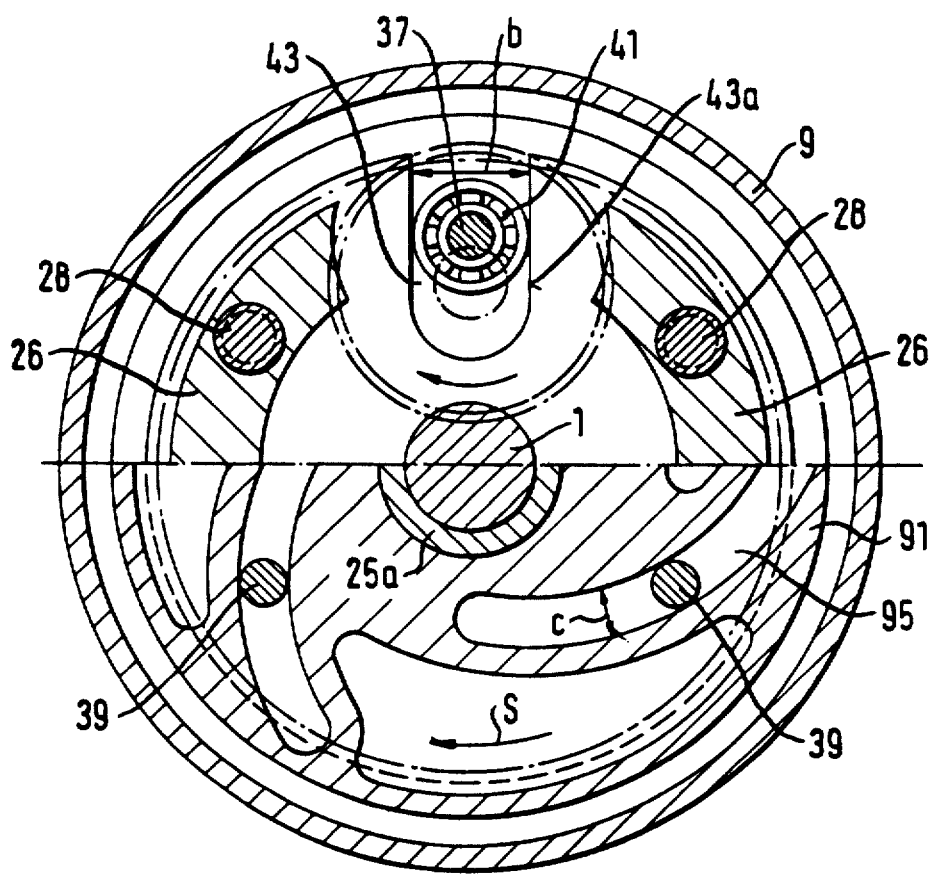
FIG. 3 is a section of the drive hub along line III—III in FIG. 1.

Whereas in FIG. 1 the transmission ratio of the drive hub is set so that a hill gear transmission is obtained, in FIGS. 2 and 3 the transmission ratio is set to a middle transmission ratio.

The drive hub represented here includes a hub axle 1 to be stationarily secured to the frame of the bicycle on which, in a manner to be described in greater detail below, a hub shell 9 provided with spoke flanges 7 is rotatably mounted over ball bearings 3 and 5. The centre line of the hub axle forms the axis 4 of the drive hub around which the hub shell 9 rotates. Axially laterally to the hub shell 9 the hub axle 1 has rotatably mounted on it by means of a ball bearing 15 a driver or actuator 13 fitted with a chain toothed wheel 11. The hub shell 9 is securely connected with a sleeve ring 81 which, for assembly reasons cannot be fitted till after the insertion of a ball friction gear 17 in the hub shell 9.

The hub shell 9 is rotatably mounted on the hub axle 1 rigidly connected with the frame in the following manner:

On the side of the drive hub situated opposite the chain toothed wheel 11 a ball carrier plate 25 on the control side is pressed together with a fixed cone 29 by a nut 83 against a projection 87 and in this manner connected solid in rotation with the hub axle 1. The ball bearings 3 and 5 designed as angular ball bearings rotatably connect the assembly of hub shell 9 and sleeve ring 81, the ball bearing 5 bearing upon the driver 13 which, again, is mounted on an adjusting cone 31. This adjusting cone 31 is screwed onto the thread of the hub axle 1 and is countered by a nut 85. It will be easy to see that the rotating parts, hub shell 9 and driver 13 are mounted both on the fixed cone 29 joined solid in rotation with the hub axle 1 and on the adjusting cone 31, and that the setting free from play of the angular ball bearings is effected by means of the adjusting cone 31.

The ball friction gear 17 is steplessly adjustable and includes the ball carrier plate 25 on the control side and a ball carrier plate 27 on the chain toothed wheel side, of which the ball carrier plate 25 on the control side is rigidly solid in rotation with the hub axle 1, as already described. The two ball carrier plates 25 and 27 are joined together by means of three spacer blocks 26 bent arc-shaped according to FIG. 3 and, for example by means of screw bolts 28 parallel with the axis 4 and passing through the spacer blocks 26, are rigidly screwed together to form a unit rigid in rotation. The ball carrier plates 25 and 27 have radial grooves 43 and 45 with a width b which corresponds to the diameter of ball bearings 41 which are guided by the groove flanks 43a and 45a. The grooves 45 and 45 are situated axially precisely facing each other, as a result of which ball axles 37 with axle pins protruding at both ends can be passed, balls 35 being mounted on them solid in rotation. Such a ball friction gear 17 carries on the periphery at least three (cf. FIGS. 2 and 3), possibly, however, four or five of these balls 35, of which one is shown in section in FIG. 1. The balls 35 roll on correspondingly concavely curved inner periphery 32 of a single guide ring 33 which is rotatably mounted around the axis 4 in the hub shell 9. By the axial pressing of a drive ring 51 onto the balls 35 towards the toothed chain wheel side, and of a driven ring 55 onto the balls 35 towards the control side, the balls 35 are pressed radially outwards against the guide ring 33. As a result of this triangle of forces the balls 35 are in a static state of equilibrium.

The drive ring 51, a drive sleeve 49 and the driver 13 all take part in bringing about the axial forces onto the balls 35. The drive ring 51, which is in frictional connection with the balls 35 is coupled solid in rotation and axially secured with the driving sleeve 49 through a longitudinal toothing 53. The entrainment of the driving sleeve 49 by the driver 13 is effected by means of a screw thread 47, preferably a flat thread, which has a pitch which produces a displacement force proportional to the driving torque in the direction of the chain toothed wheel (arrow A) ensuring a slipfree frictional locking to the balls 35. In the case of the introduction of the torque the axial force acting in the direction of the chain toothed wheel 11 is therefore produced by the right-hand thread 47 and transmitted by the driving sleeve 49 along the longitudinal toothing 53 onto the driving ring 51. At the places of contact with the balls 35 additional radial forces are produced which are taken up by the guide ring 33 and passed on to the driven ring 55, where, again, there arises an axial force component in the direction of the chain toothed wheel 11 which is led back over an axial bearing 19 onto the driver 13, results in a closed circuit of inner forces. A pressure spring 57 has the task of tensioning the drive sleeve 49 against the axial bearing 19 in such a manner that the drive ring 51 is pulled in the direction towards the balls 35 (arrow A), as a result of which there arises in the ball friction gear 17 an absence of play as well as a small pretensioning force which is necessary for its reliable response when starting the vehicle.

The driven ring 55 is at its chain toothed wheel side connected with a sun wheel 59 by means of a tubular body 58 in integral manner. The sun wheel 59 forms part of a planetary gear 21 the planet wheels 61 of which are rotatably mounted by means of bolts 63 on the driver 13. By this means the driver 13 acts at the same time as a planet wheel carrier in this planetary gear 21. Also belonging to the planetary gear 21 is a ring gear 69 which is rotatably mounted on the tubular body 58 of the driven ring 55 and carries on its outer diameter a pawl free-wheeling clutch 23. The pawls 65 of the pawl free-wheeling clutch 23 are connected with the hub shell 9, as a result of which there is idling in one direction of rotation, and in the other direction, here the driving direction, a positive entrainment over a pawl toothing 67 on the inner circumference of the hub shell 9.

In the already mentioned unit formed of the ball carrier plates 25 and 27 a number of balls 35 are arranged along a circle central to the axis 4 and situated in a radial plane (see FIG. 2). The axle-pin ends of the ball axles 37 protruding over the periphery of the balls are secured over the ball bearings 41 in the grooves 43 and 45 of the ball carrier plates 25 and 27 in such a manner that they can move only in a radial plane defined by the longitudinal direction of the groove and containing the axis 4. The number of balls is at least three and optimally between four and six, there being just as many radial grooves 43 and 45 in the ball carrier plates 25 and 27. The grooves 43 and 45 guide with their flanks 43a and 45a the ball bearings 41 which are mounted on the ends of the axle pins of the ball axles 37. For reasons of a small dead travel when switching from one direction of rotation over to the other, the grooves 43 and 45 have a width which corresponds to the diameter of the ball bearings 41 plus a small movement play. As a result of the arrangement of the oppositely-placed radial grooves 43 and 45 in the rigidly screwed connection of the parts 25 and 27, both ball bearings 41 and therefore also the axle pins move in planes which all intersect at the centre of the hub axle (axis 4). The swivelling of these axle pins produces in known manner, through the modification of the distances of the points of contact of the parts 33, 51 and 55 participating in the friction gear from the centre line of the axle pins 37 an alteration of the speed difference between drive ring 51 and driven ring 55 which difference becomes nil on the parallel coaxial position of the axle pins 37 relative to the axis 4 of the hub. In FIG. 1 there are respectively indicated by means of a shaded line the rather small circle of contact B1 between the drive ring 53 and the ball 35 for the represented inclination of the ball axis 37, as well as the relatively great circle of contact B2 between the driven ring 55 and the ball 35. The transmission ratio of the ball friction gear 17 corresponds to the diameter ratio of the contact circles B1 and B2.

The swivelling of the ball axles 37 is effected by means of a control device 79 which can be adjusted by the cyclist, for example using cable pulls and a hand lever not shown here. Here, a control wheel 71 is rotated which transmits this rotational control movement via a control axle 73 to a toothed wheel 75 which cooperates with a ring gear 93 of a crank wheel 91 and can adjust this in both directions of rotation with reduced angle velocity of the crank wheel 91 as compared with the control wheel 71. In this connection it is of no consequence whether the user moves the control wheel actively in both directions or only in one direction, and leaves the resetting to a return spring mounted in the cable pull.

As FIGS. 1 and 3 show, the crank wheel 91 is rotatably mounted on a shoulder 25a of the ball carrier plate 25 on the control side, rigidly secured to the hub axle. It has, on the chain toothed wheel side surface, several guide grooves 95 provided in spiral form, into which there engage ball projections 39 which are integrally connected with the respective pins of the ball axles 37. The guide grooves 95 have a width c which is only slightly greater than the diameter of the ball projections 39 to keep down the dead travel occurring between the two directions of engagement.

Thus, for example, if the control device 79 is actuated in such a way that the toothed wheel 75 and therefore the crank wheel 91 rotate clockwise in FIG. 3, the ball projections are shifted radially outwards and the ball axles 37 in FIG. 1 are swivelled clockwise in FIG. 1 around the ball centre point M. By this means the transmission ratio in the friction gear 17 is modified in the direction of fast travel. From the one extreme position of the ball axles 37 to the other, the transmission ratio in the ball friction gear 17 in the proposed construction changes in such a manner that, when the fast travel is applied, the driven ring 55 rotates about eight times faster than when the hill gear is applied (cf. FIG. 1) for the same rotational speed of the drive ring 51 in each case. Such a transmission ratio is in many cases too high for bicycle gear hubs and demands too high axial forces in extreme transmission positions. This transmission range is therefore reduced, by the planetary gear and its transmission into slow motion from inside outwards by the factor of this transmission ratio.

The advantage of the combination of the submitted planetary gear 21 with the ball friction gear 17 lies in that the losses of the planetary gear 21, because of its low relative rotational speed are small, and in that, substantially in the centre of the transmission of the transmission range (cf. FIGS. 2 and 3) the rotational speeds of the driven ring 27 and hub shell 9 are the same, namely when the ball axles 37 and the hub axle 4 lie parallel to one another. In this case no toothed wheel movements take place at all. This gear position is also the one which marks the rotation direction reversing point for the planetary gear 21. By means of the transmission ratio of the planetary gear 21 the transmission range of about 2.5 usual for bicycles is easily achievable.

Important aspects of the invention are discussed below:

The drive hub for a vehicle, particularly for a bicycle, comprises a hub axle 1, a hub shell 9 rotatable relative thereto, and a driver or actuator 13 mounted on the hub axle 1. The driver 13 drives the hub shell 9 over a ball friction gear 17, the ball carrier plates 25 and 27 of which form with the hub axle 1 a rigid gear housing the balls 35 of which, with a guide ring 33, a drive ring 51 and a driven ring 55 enter into a frictional connection which, by the swivelling of the axle pins 37 between drive ring 51 and driven ring 55, permits different rotational speeds. The pressure forces are produced by a thread 47 between driver 13 and drive sleeve 49 proportionally to the driving torque, the pressure spring 57 ensuring a dead-travel-free response of the ball friction gear 17. The infinitely variably adjustable transmission ratio of the ball friction gear 17 is controlled, through a control device 79, consisting of rotational elements, through a solid cone 29 which sets in rotation a crank wheel 91, as a result of which the spiral-shaped guide grooves 95 move the ball projections 39 of the ball axles 37 radially outwards or inwards, depending upon the direction of rotation. The ball axles thus swivelled provide for an infinitely variably adjustable transmission ratio between drive ring and driven ring.

While specific emodiments of the invention have been shown and described in detail to illustrate the application of the inventive principles, it will be understood that the invention may be embodied otherwise without departing from such principles.

What I claim is:

1. A drive hub for a vehicle, particularly a bicycle, comprising:
   a hub axle (1) which determines an axis (4) of the drive hub;
   a hub shell (9) surrounding the hub axle (1) with an identical axis to said axis of said drive hub and rotatable relative thereto;
   a driver (13) rotatably mounted relative to the hub shell (9) and the hub axle (1);
   a friction gear mounted inside the hub shell (9) in a power path between the driver (13) and the hub shell (9) the friction gear having an infinitely adjustable transmission ratio;
   at least one coupling device (23) closing the power path between the driver (13) and the hub shell (9) when the hub is driven by the driver (13), and opening the power path when the driver is not driving;
   a planetary gear (21) in the power path between driver (13) and hub shell (9); and
   a control device (79) externally actuatable for infinitely variable adjustment of the transmission ratio of the friction gear (17);
   wherein the friction gear is a ball friction gear (17) comprising two rings, one drive ring (51) and one driven ring (35), facing each other axially, several friction balls (35) distributed in a circumferential direction of the rings (51, 55) and joining the rings together in frictional engagement, which balls (35) are rotatably mounted by means of ball axles (37), and a friction ball carrier mounted to the hub axle (1) for joint rotation, on which carrier the friction balls (35) with their ball axles (37) are respectively swivellably mounted in a plane which contains the axis (4) of the hub;
   wherein a planet gear carrier of the planetary gear (21) is coupled with the driver (13), said planet gear carrier being provided with planet wheels (61) engaging on the one hand with a sun wheel (59) coupled with the driven ring (55), and on the other hand with a ring gear (69) coupled with the hub shell (9); and
   wherein said control device (79) is adapted for the joint swivelling of the ball axles (37).

2. A drive hub according to claim 1, wherein
   the driver (13) is provided with bolts (63) for the rotatable mounting of the planet wheels (61).

3. A drive hub according to claim 1, wherein
   the coupling device is designed as a pawl free-wheel coupling (23) and is mounted between the ring gear (69) and the hub shell (9).

4. A drive hub according to claim 3, wherein
   a pawl toothing (67) is provided on the inner circumference of the hub shell (9).

5. A drive hub according to claim 1, further comprising a threaded connection mounted in the power path between the driver (13) and the ball friction gear (17) for the axial tensioning of the ball friction gear (17) with increase of the pressure force between the friction balls (35) and the driven and the driving rings (51, 55) with increasing driving torque.

6. A drive hub according to claim 5, wherein
   the drive ring (51) is connected with the driver (13) by means of a drive sleeve (49) for torque transmission, the drive sleeve being connected for joint rotation with one (49) of the driver (13) and the drive ring (49), and also being coupled with the other (13) of the driver (13) and the drive ring (49) by means of a right hand thread (47).

7. A drive hub according to claim 6, wherein
   the thread (47) is a flat thread with substantially rectangular tooth profile.

8. A drive hub according to claim 6, wherein
   the drive sleeve (49) surrounds the hub axle (1) over the entire length of the hub axle and, together with the hub axle (1), forms a bearing.

9. A drive hub according to claim 3, wherein
   the driven ring (55) is connected with the hub shell (9) via the sun wheel (49), the planet wheels (61), the ring gear (69) and the pawl free-wheel coupling (23).

10. A drive hub according to claim 9, wherein
    the driven ring (55) and the sun wheel (49) are integrally joined together and form a tubular body (58) which is rotatably mounted on a drive sleeve (49).

11. A drive hub according to claim 1, wherein
    the friction ball carrier comprises a first ball carrier plate (25) which is connected with the hub axle (1)

for joint rotation, and a plurality of radial grooves (43) to receive ends of the ball axles (37) protruding from the friction balls (35).

12. A drive hub according to claim 11, wherein the friction ball carrier comprises a second ball carrier plate (27) which is connected axially with the first ball carrier plate (25) for joint rotation and which is provided with a plurality of grooves (45) which lie opposite the grooves (43) of the first ball carrier plate (25).

13. A drive hub according to claim 12, wherein the ends of the ball axles (37) are provided with ball bearings (41) which engage into the respective radial grooves (43, 45) with play for moving the respective end in radial direction.

14. A drive hub according to claim 1, wherein at least one of two ends of the ball axles (37) protruding from the friction balls (35) is provided with a connection part onto which the control device (79) engages for the swivelling of the ball axles (37).

15. A drive hub according to claim 14, wherein the control device (79) further comprises a crank slider wheel (91) with guide grooves (95); and the connection parts of the ball axles (37) comprise ball projections (39) which engage said guide grooves (95).

16. A drive hub according to claim 15, wherein the guide grooves (95) are of spiral design and guide the ball projections (39) with slight play.

17. A drive hub according to claim 15, wherein the crank slider wheel (91) is provided on the side thereby facing the guide grooves (95) with a ring gear toothing (93) into which a control pinion (57) engages.

18. A drive hub according to claim 1, wherein all friction balls (35) roll on the inner circumference of a common guide ring (33) freely rotatable mounted in the hub shell (9).

19. A drive hub according to claim 1, wherein a tensioning spring member is provided for axial tensioning of the drive ring (51) and the driven ring (55) towards each other.

20. A drive hub according to claim 19, wherein the tensioning spring member is a pressure spring (57) which bears on drive sleeve (49) joining the drive ring (51) with the driver (13), and on the other hand on an annular body (58) supporting the driven ring (55) and surrounding the driving sleeve (49).

21. A drive hub according to claim 20, wherein the pressure spring (57) bears on an axial bearing (19) mounted between the annular body (58) and the driver (13).

22. A drive hub according to claim 1, wherein the inner axial forces issuing from the driver (13) are compensated for by the driving sleeve (49), the driving ring (51), the friction balls (35), a guide ring (33) surrounding the friction balls (35), the driven ring (55) and an axial bearing (19) mounted between the driven ring (55) and the driver (13).

* * * * *

UNITED STATES PATENT AND TRADEMARK OFFICE
CERTIFICATE OF CORRECTION

PATENT NO. : 5,318,486
DATED : June 7, 1994
INVENTOR(S) : Manfred Lutz

It is certified that error appears in the above-indentified patent and that said Letters Patent is hereby corrected as shown below:

Col. 5, line 21, "bal" should read --ball--;
Col. 10, line 6, "driven ring (35)" should read --driven ring (55)--;
Col. 12, line 2, "thereby" should read --thereof--;
Col. 12, line 15, "on" should read --on a--;
Col. 12, lines 16-17, delete "the other hand on".

Signed and Sealed this

Thirteenth Day of December, 1994

Attest:

BRUCE LEHMAN

Attesting Officer

Commissioner of Patents and Trademarks